*(12)* United States Patent
Van Dyn Hoven

(10) Patent No.: US 8,616,735 B2
(45) Date of Patent: Dec. 31, 2013

(54) LIGHT SURROUND

(75) Inventor: Victoria Jean Van Dyn Hoven, Stevens Point, WI (US)

(73) Assignee: Vickie Jean's Creations, Inc., Plover, WI (US)

( * ) Notice: Subject to any disclaimer, the term of this patent is extended or adjusted under 35 U.S.C. 154(b) by 130 days.

(21) Appl. No.: 12/732,099

(22) Filed: Mar. 25, 2010

(65) Prior Publication Data

US 2010/0177506 A1    Jul. 15, 2010

Related U.S. Application Data

(63) Continuation of application No. 11/481,471, filed on Jul. 6, 2006, now abandoned.

(60) Provisional application No. 60/755,605, filed on Dec. 30, 2005.

(51) Int. Cl.
*F21V 3/00*    (2006.01)
*F21V 5/00*    (2006.01)

(52) U.S. Cl.
USPC ... 362/311.03; 362/96; 362/121; 362/249.06; 362/249.14; 362/249.16; 362/311.06; 362/256; 362/255; 362/249.18; 362/311.13; 362/311.14; 362/311.15; 362/363; 362/806

(58) Field of Classification Search
USPC ............ 362/96, 121, 122, 249.06, 249.14, 362/249.16, 249.17, 249.18, 255, 256, 362/311.03, 311.06, 311.13, 311.14, 362/311.15, 363, 806, 807
See application file for complete search history.

(56) References Cited

U.S. PATENT DOCUMENTS

| | | | | |
|---|---|---|---|---|
| 1,803,334 | A * | 5/1931 | Lehmann | 219/473 |
| 3,663,282 | A | 5/1972 | Smith | |
| 3,763,347 | A * | 10/1973 | Whitaker | 392/391 |
| 4,965,490 | A | 10/1990 | Ratner | |
| 5,428,516 | A | 6/1995 | Harris | |
| 5,599,092 | A * | 2/1997 | Yen | 362/294 |
| 5,908,231 | A | 6/1999 | Huff | |
| 5,951,148 | A | 9/1999 | Limber | |
| 6,086,225 | A | 7/2000 | Kahl et al. | |
| 6,095,664 | A | 8/2000 | Wang | |
| 6,155,695 | A | 12/2000 | Sealy | |
| 2002/0012246 | A1* | 1/2002 | Rincover et al. | 362/186 |
| 2002/0141185 | A1 | 10/2002 | Spiro | |
| 2003/0043579 | A1 | 3/2003 | Rong et al. | |
| 2003/0210541 | A1 | 11/2003 | Long | |
| 2004/0257806 | A1 | 12/2004 | Wu | |
| 2005/0036313 | A1* | 2/2005 | Daucher et al. | 362/255 |
| 2005/0052885 | A1 | 3/2005 | Wu | |
| 2005/0111221 | A1 | 5/2005 | Van Dyn Hoven | |
| 2005/0195600 | A1* | 9/2005 | Porchia et al. | 362/240 |
| 2006/0002102 | A1* | 1/2006 | Leonard | 362/96 |
| 2006/0203498 | A1* | 9/2006 | Lin | 362/351 |

* cited by examiner

*Primary Examiner* — Jong-Suk (James) Lee
*Assistant Examiner* — Tsion Tumebo
(74) *Attorney, Agent, or Firm* — Rathe Lindenbaum LLP

(57) ABSTRACT

A light emitter has a light surround about the emitter formed from silicone having internally encapsulated plant materials.

19 Claims, 11 Drawing Sheets

LIGHT SURROUND

CROSS REFERENCE TO RELATED APPLICATIONS

This continuation appliction claims priority under 35 USC §120 from co-pending U.S. patent application Ser. No. 11/481,471 filed on Jul. 6, 2006 by Victoria Jean Van Dyn Hoven and entitled LIGHT SURROUND which claims party under 35 USC §119 from US provisional U.S. Patent Application Ser. No. 60/755,605 filed on Dec. 30, 2005 by Victoria Jean Van Dyn Hoven and entitled LIGHT SURROUND AND MULTI-CHARACTERISTIC LIGHT COVERING, the full disclosures both of which are hereby incorporated by reference.

BACKGROUND

Decorative lights are frequently used to decorate during holidays or other occasion. Many decorative lights are limited to the shape of the bulb. Others have rigid translucent shells about the bulbs. Such shells lack desired light transmitting or tactile characteristics.

DESCRIPTION OF EXAMPLE EMBODIMENTS

Figure 1:
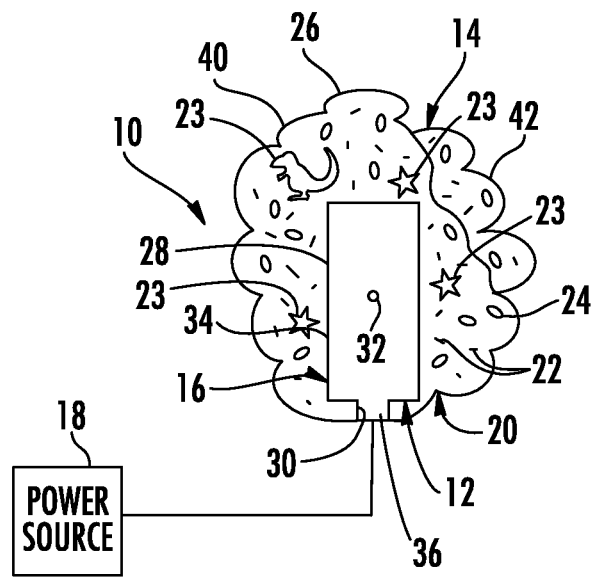
FIG. 1 is a sectional view schematically illustrating a decorative ornament according to one example embodiment.

FIG. 1 is a sectional view schematically illustrating one example of a decorative object or ornament 10 according to one example embodiment. Decorative ornament 10 provides light or emits light through a decorative outer encasing. Ornament 10 generally includes light source 12 (schematically illustrated) and a decorative light surround 14 (also schematically illustrated). Light source 12 comprises a device configured to emit light. Light source 12 generally includes light emitter 16 and a power source 18. Emitter 16 comprises a device configured to convert power supplied by power device 18 to electromagnetic radiation in the form of visible light. In one embodiment, emitter 16 may comprise an incandescent bulb. In another embodiment, emitter 16 may comprise one or more light emitting diodes. In still other embodiments, emitter 16 may comprise other devices or structures configured to emit electromagnetic radiation, such as visible light, which is at least partially transmitted through surround 14. In one embodiment, emitter 16 emits white light. In still other embodiments, emitter 16 emits selected portions of the visible spectrum of visible light such as red light, green light, blue light or combinations thereof. In still other embodiments, emitter 16 may be configured to emit other forms of electromagnetic radiation such as ultraviolet light, wherein surround 14 may include particles or layers of materials that themselves emit visible light in response to being irradiated with generally non-visible electromagnetic radiation such as ultraviolet light. For example, in one embodiment, surround 14 may include various phosphors or other materials which upon being excited by ultraviolet light from emitter 16 emit one or colors of visible light.

Power source 18 comprises a source of power for emitter 16. Power source 18 is electrically connected to emitter 16 so as to supply electrical current to emitter 16. In one embodiment, power source 18 may comprise a direct current or alternating current voltage source. In particular embodiments, power source 18 may be provided by one or more batteries or may generate electrical current from solar cells or other sources. In particular embodiments, ornament 10 may omit power source 18, wherein ornament 10 is configured to be releasably connected to power source 18 via a plug or other connecting structure.

Light surround 14 comprises an at least partially translucent body of one or more materials having a 3-dimensional shape formed at least partially about emitter 16. Surround 14 diffuses light such that surround 14 or at least portions of surround 14 are illuminated. In particular embodiments, body 14 may additionally filter certain wavelengths of light such as when surround 14 is colored.

In the particular example illustrated, surround 14 generally includes body 20, particulates 22 and bubbles 24. Body 20 encapsulates particulates 22, embedded objects 23 and bubbles 24 that includes external surface 26, internal cavity 28 and mouth 30. External surface 26 generally extends about internal cavity 28 and forms the outermost surface of body 20. External surface 26 (schematically shown) is 3-dimensional in nature in that surface 26 is not generally flat and smooth along the entirety of surface 26. Rather, surface 26 has variations such that surface 26 is more than simply a coating. Surface 26 has variations such that body 20 has a 3-dimensional shape. Although schematically shown, body 20 and surface 26 may be configured to provide surround 14 with one of various decorative or ornamental configurations. For example, in one embodiment, surface 26 may be configured in a shape associated with a holiday. For example, in one embodiment, surface 26 of body 20 may be configured such that surround 14 has a shape selected from a group of shapes consisting of one or more stars (associated with Christmas or the Fourth of July), one or more hearts (associated with Valentine's Day), one or more eggs or one or more crosses (associated with Easter), one or more pumpkins (associated with Halloween), one or more Christmas trees, one or more Santas, one or more bells, one or more candles, one or more candy canes (associated with Christmas) or one or more shamrocks (associated with St. Patrick's Day). Other examples of holiday shapes and associated holiday scents are provided in U.S. Pat. No. 6,935,762 issued on Aug. 30, 2005 and entitled LIGHT STRING ASSEMBLY, the full disclosure of which is hereby incorporated by reference and a copy of which is attached as exhibit B. In still other embodiments, surface 26 and body 20 may be configured that surround 14 has other decorative 3-dimensional shapes.

Internal cavity 28 comprises an opening, gap, space or volume within body 20 configured to receive emitter 16. In one embodiment, internal cavity 28 is sized and configured substantially the same as the size and configuration of emitter 16. For example, in one embodiment in which emitter 16 comprises a bulb, cavity 28 is also in the shape of a bulb. According to one example embodiment, internal cavity 28 is sized and configured within body 20 such that an origin 32 (such as the filaments of an incandescent bulb) of light from emitter 16 is substantially centered either transversely or longitudinally within body 14. As a result, light is more uniformly transmitted through body 20. In other embodiments, cavity 28 may be configured such that origin 32 of light from emitter 16 is not centered within body 20. Although cavity 28 is illustrated as being generally rectangular simply as a schematic illustration, cavity 28 may have various other sizes, shapes and configurations.

Mouth 30 comprises that portion of body 20 extending about and forming an opening leading to internal cavity 28. Mouth 30 is generally smaller than that portion of emitter 16 proximate to or about origin 32. In particular embodiments, emitter 16 may have a neck which extends alongside and through mouth 30. In particular embodiments, mouth 30 of body 20 is formed from a material having sufficient flexibility so as to permit larger head 34 of emitter 16 to pass through mouth 30 and to be inserted into cavity 28. During such insertion, mouth 30 flexes or deforms to allow insertion of head 34. Once head 34 of emitter 16 has been inserted into cavity 28, portions of mouth 30 resiliently return to the original shape or configuration. In particular embodiments, mouth 30, upon returning to its original shape or configuration bears against neck 36 of emitter 16. As a result, mouth 30 permits surround 14 to be preformed separate from emitter 16 and permits emitter 16 to be subsequently inserted into cavity 28. As a result, surround 14 may be positioned about emitter 16 with the reduced risk of emitter 16 becoming damaged, or broken as compared to other embodiments, wherein surround 14 is molded directly about emitter 16, subjecting emitter 16 to relatively high injection or molding pressures which may otherwise damage emitter 16 due to variations in the shape or configuration of emitter 16.

In particular embodiments, emitter 16 may be bonded or fused to surround 14 to inhibit its removal from surround 14. For example, in particular embodiments, a translucent adhesive material may be applied to the exterior of emitter 16 or the interior surface of cavity 28 upon insertion of emitter 16 through mouth 30 into cavity 28, thereby preventing separation of emitter 16 from surround 14 during shipping or in use. In other embodiments, emitter 16 may be removably inserted into cavity 28, permitting emitter 16 to be withdrawn through mouth 30 (causing flexing or deformation of mouth 30) such that emitter 16 may be replaced or repaired or such that surround 14 may be exchanged for another surround 14.

According to one example embodiment, not only is mouth 30 formed from a flexible material, but substantially the entirety of body 20 is formed from a flexible or soft material. As a result, body 20 has a soft and pleasing outer appearance and touch. Moreover, body 20 is less likely to become chipped, scratched or damaged and is less likely to damage, scratch or chip other articles or objects which may come into contact with surround 14. At the same time, surround 14 serves as an insulator, insulating heat that may be generated by emitter 16 and protecting emitter 16 by providing a decorative or ornamental configuration through which light or other electromagnetic radiation is at least partially transmitted. According to one example embodiment, body 20 is formed from a silicon based material such as silicone. In one embodiment, body 20 is formed from a colored silicone such that body 20 filters selected wavelengths of light. In one embodiment, body 20 may alternatively or additionally be scented by the addition of one or more scented additives (e.g. vanilla extract) (not generally visible). In particular embodiments in which body 20 is formed from silicone, emitter 16 is bonded to the interior surface of cavity 28 of body 20 by silicone. As a result, emitter 16 and body 20 have a stronger bond therebetween. Examples of silicone compositions, scent and various additives are found in U.S. patent application Ser. No. 10/870,175 filed on Jun. 17, 2004 and entitled DECORATIVE LIGHT ASSEMBLY, the full disclosure of which is hereby incorporated by reference and which is attached as exhibit A.

As further shown by FIG. 1, in particular embodiments, body 20 may include distinct portions 40, 42 formed from distinct silicones. For example, in one embodiment, portion 40 and portion 42 may be formed from different silicones having distinct colors and/or distinct scents. In still other embodiments, body 20 may alternatively comprise a single silicone or greater than two distinct silicones having different colors or scents due to different generally invisible addictives providing such colors or scents.

Particulates 22 comprise internally embedded particulate materials within body 20. Particulates 22 absorb and reflect light or other electromagnetic radiation provided by emitter 16. For example, in one embodiment, particulate materials 22 may comprise glitter or confetti. In particular embodiments, particulate materials 22 may additionally be configured to provide a scent. For example, and one embodiment, particulates 22 may comprise coffee grains (ground coffee beans). In one embodiment, particulates 22 comprise hazelnut coffee grains or crystals commercially available under the brand FOLGERS. In one embodiment, materials 22 comprise poppy seeds. In yet other embodiments, particular 22 may comprise a whole, ground or cut plant materials such as seeds, spices, or ground plant or flower parts. In other embodiments, particulate materials 22 may comprise granules or flakes visible through material of body 20. In other embodiments, particulate materials 22 may comprise phosphors, which upon being excited, such as upon receiving ultraviolet light or radiation from emitter 16, emit visible light. Particulate materials 22 are generally provided by mixing such particulate materials 22 in one or more materials of body 20 while the one or more materials of body 20 are in a fluid state. For example, in embodiments where body 20 is formed from silicone, particulate materials 24 are mixed and distributed throughout the silicone or prior to the silicone being cured and while the silicone is in a fluid state. Upon curing or solidifying, the flexible material of body 20 fixes particulate material 22 throughout the matrix of material provided by body 20.

Embedded objects 23 comprise miniature objects having shapes corresponding to full-sized objects and formed from plastic, wood, metal or other materials. In one embodiment embedded objects 23 may have shapes corresponding to holidays such as hearts, stars, shamrocks, crosses, eggs, pumpkins, witches and the like. And one embodiment, objects 23 may be colored or may have multiple colors associated with a particular holiday or event. In one embodiment, objects 23 may comprise one or more alphanumeric symbols or words. An example illustrated, object 23 illustrated as a miniature polymeric or plastic star in a miniature or plastic dinosaur. In one embodiment, surround 14 may include one or multiple of such miniature objects 23.

Bubbles 24 comprise pockets or cavities of air or other gas dispersed or distributed throughout the material of body 20. Bubbles 24 visually alter light or other electromagnetic radiation being transmitted through body 20 or being reflected or emanating from particulate materials 22. In particular embodiments, bubbles 24 may be uniformly distributed throughout body 20. In other embodiments, bubbles 24 may be non-uniformly distributed within body 20. According to one embodiment, bubbles 24 are formed by injecting air or other gas into the material of body 20 prior to the material of body 20 solidifying, curing or hardening. In particular embodiments, bubbles 24 may alternatively be formed by the addition of a gassing agent to the one or more materials of body 20. Although surround 14 is illustrated as including both particulate material 22 and bubbles 24, in other embodiments, surround 14 may alternatively include only one or none of particulate materials 22 and bubbles 24.

In other embodiments, although light surround 14 has been described as being provided with cavity 28 and as having emitter 16 subsequently inserted into cavity 28, in other embodiments, surround 14 may be molded directly about emitter 16. For example, in particular embodiments, emitter 16 may be placed between two or more mold portions or within a mold as the one or more materials of body 20 are injected into the mold about emitter 16.

Overall, ornament 10 provides an attractive, illuminated decorative object being manufactured at a low cost. In those embodiments in which substantially the entirety of body 20 is formed from a flexible or soft material, surround 14 provides ornament 10 with a soft compliant outer surface less likely to become damaged or to damage objects coming into contact with surround 14. At the same time, surround 14 covers and protects emitter 16 while transmitting light or other electromagnetic radiation in a pleasing fashion.

Figure 2:
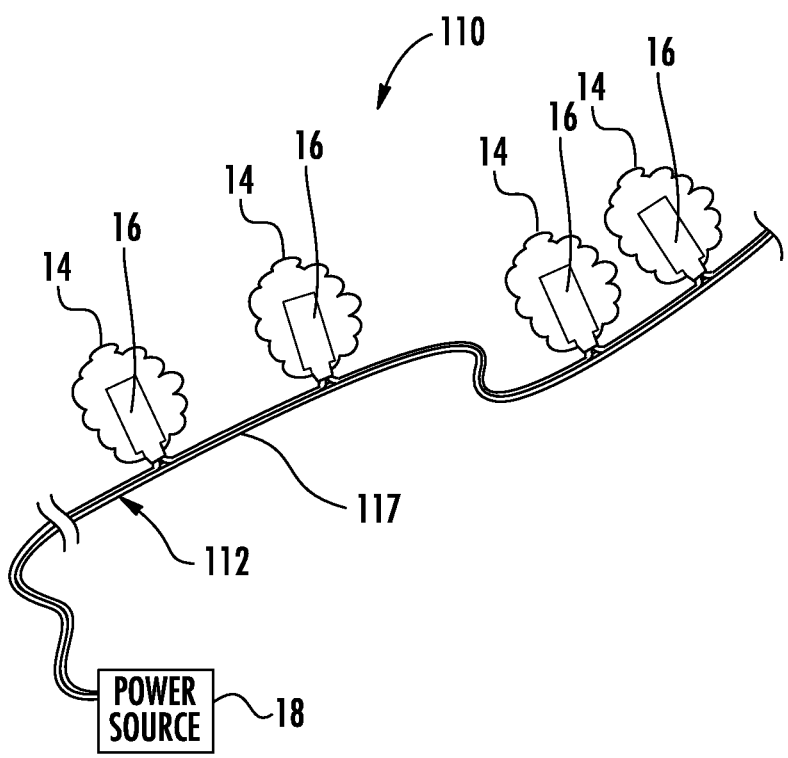
FIG. 2 is a sectional view schematically illustrating another embodiment of the ornament of FIG. 1 according to an example embodiment.

FIG. 2 schematically illustrates ornament 110, another embodiment of ornament 10. Ornament 110 is similar to ornament 10 except that ornament 110 includes light source 112 and multiple light surrounds 14. Light source 112 is similar to light source 12 except that light source 112 includes multiple light emitters 16 (schematically shown) surrounded by surrounds 14, electrical interconnect or string 117 and power source 18. Emitter 16 and power source 18 are substantially similar to that described with respect to similar elements described above with respect to ornament 10. String 117 comprises one or more wires configured to transmit electrical power from power source 18 to each of emitters 16. Such wires may be coated or covered with electrically insulating material. According to one example, ornament 110 is configured as a string of lights such as those being positioned about a Christmas tree or hung along a house or other structure. In one embodiment, each of surrounds 14 may be similarly shaped or configured. In some embodiments, each of surrounds 14 may have the same scent. In other embodiments, one or more of surrounds 14 may have different shapes, may have different colors or may have different scents.

Figure 2A:
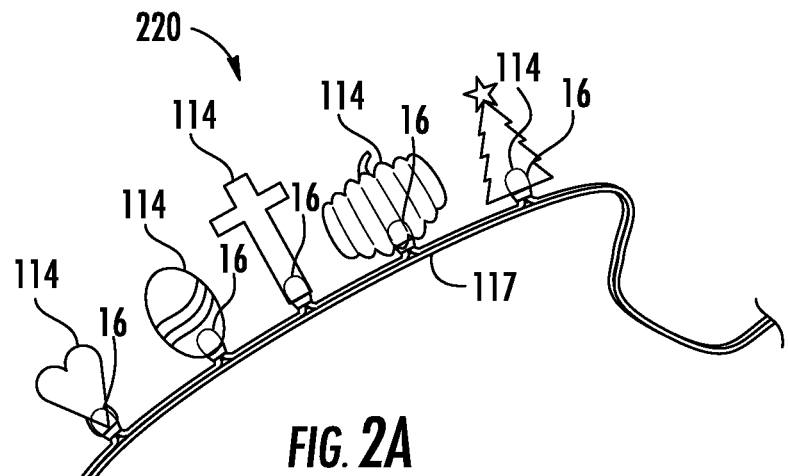
FIGS. 2A and 2B are sectional views schematically illustrating another embodiment of the ornament of FIG. 1 according to an example embodiment.
Figure 2B:
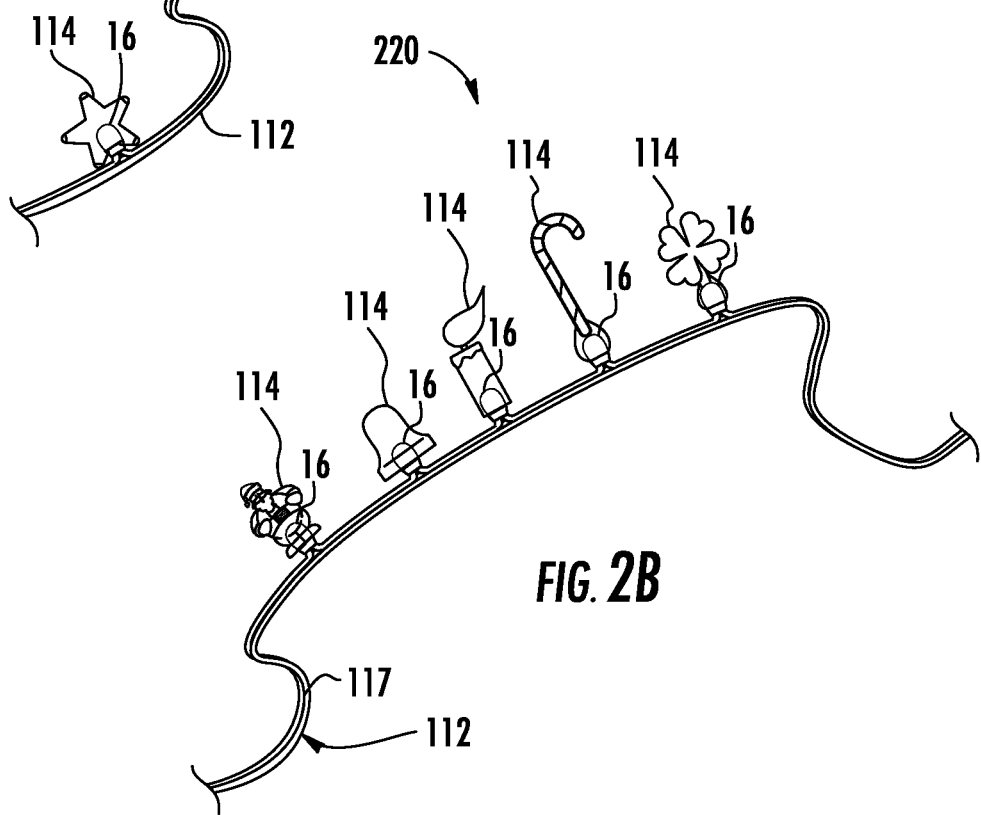

FIGS. 2A and 2B schematically illustrates ornament 220, another embodiment of ornament 110. Ornaments 220 includes light source 112 and multiple light surrounds 114. Light source 112 includes multiple light emitters 16 (schematically shown) surrounded by surrounds 114, electrical interconnect or string 117 and power source 18 (shown in FIG. 2). As shown by FIGS. 2A and 2B, surrounds 114 may have various holiday shapes such as stars, hearts, eggs, crosses, pumpkins, Christmas trees, Santas, bells, candles, candy canes, shamrocks and the like. In one embodiment, ornament 220 includes a single similarly shape for each of surrounds 114 along the length of light source 112. In other embodiments, ornament 220 may have a mixture of multiple shapes for surrounds 114. In One Embodiment, each of surrounds 114 may have the same scent. In other embodiments, one or more of surrounds 114 may have different shapes, may have different colors or may have different scents are may omit scents.

Figure 3:
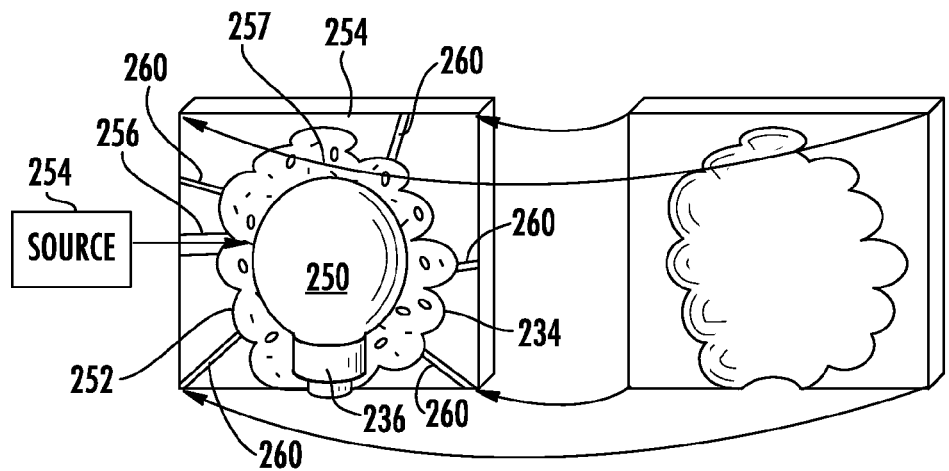
FIG. 3 is an exploded perspective view schematically illustrating an example process performing a light surround.
Figure 4:
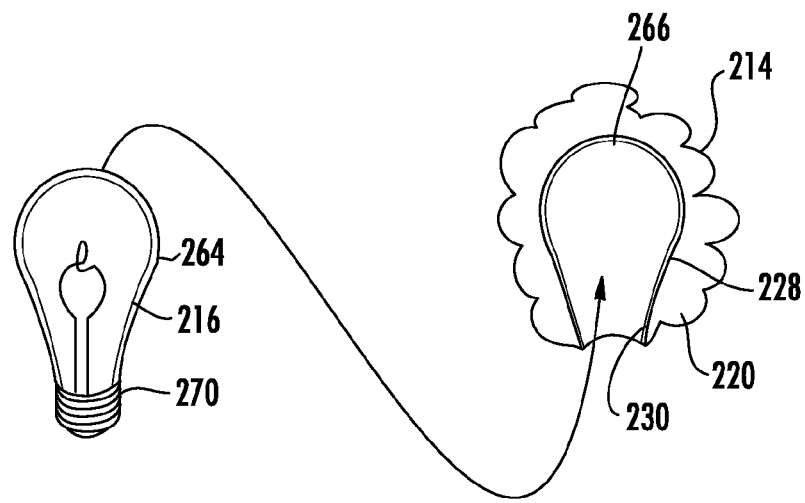
FIG. 4 is an exploded sectional view schematically illustrating an example process for forming a decorative ornament.
Figure 5:
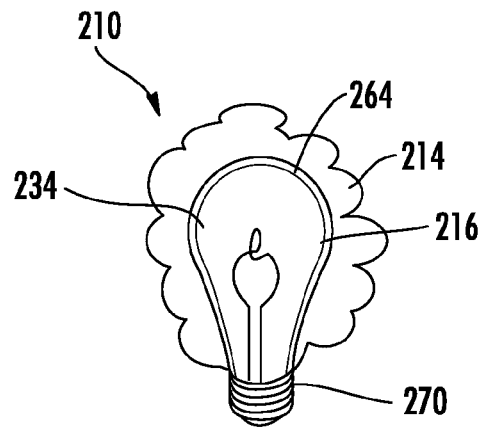
FIG. 5 is a sectional view of the decorative ornament of FIG. 4.
Figure 6:
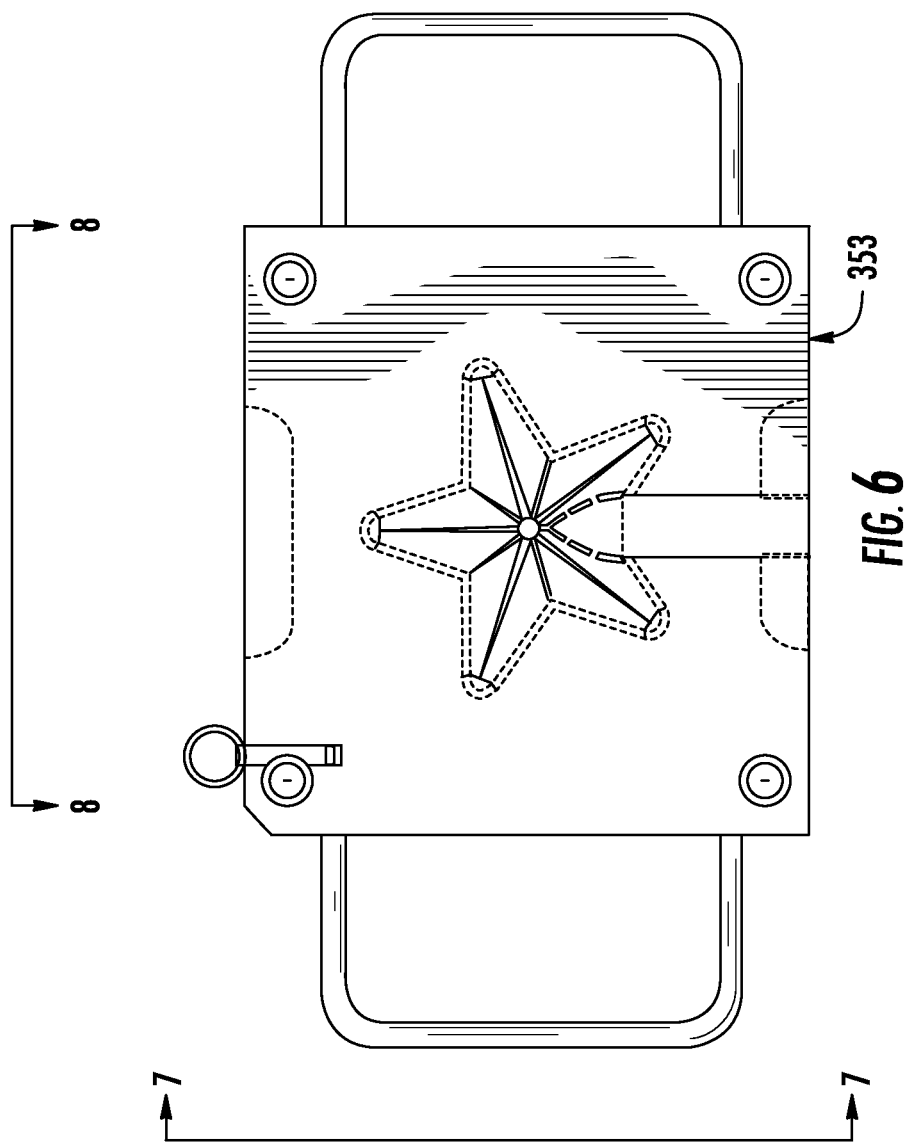
FIG. 6 is a top plan view of a portion of a mold for forming one embodiment of a decorative ornament according to an example embodiment.

FIGS. 3-5 schematically illustrate one example of a process for forming ornament 210 (shown in FIG. 5), an embodiment of ornament 10. As shown by FIG. 4, ornament 210 (shown in FIG. 5) includes light surround 214 and light emitter 216 (shown as an incandescent bulb). As shown by FIG. 3, light surround 214 is formed by positioning a core 250 within a mold cavity 252 provided by one or more mold portions 254. Core 250 is configured so as to provide or form internal cavity 228 and mouth 230 of surround 214 (shown in FIG. 4). To this end, core 250 has a head 234 and a smaller neck 236. In one embodiment, neck 236 has an outer surface that is flexible or compressible so as to serve as a gasket or seal against mold portions 254. In one embodiment, core 250 is formed from nylon. In other embodiments, core 250 may be formed from other materials or more than one material.

Once core 250 has been positioned within mold cavity 252 and mold portions 254 have been closed about core 250, more materials of body 220 surround 214 are injected by a material source 254 through sprew hole 256 into cavity 252. In the particular example illustrated, hole portions 254 include appropriately positioned vents 260 to facilitate escape of air from cavity 252 as the one or more materials flow about core 250. According to one example embodiment, one or more materials injected into cavity 252 comprise silicone in a fluid, viscous or semi-viscous state. As noted above with respect to ornament 10, in particular embodiments, the one or more materials injected through sprew hole 256 and forming body 220 of surround 214 may be scented and/or colored. The materials may also include particulate materials 22 or bubbles 24. Upon the one or more materials that have been injected about core 250 has sufficiently solidified or cured, mold portions 254 are separated and core 250 is withdrawn, providing surround 214 shown in FIG. 4. In particular embodiments, core 250 may be removed from the materials forming body 220 flexing the material of mouth 230. In yet other embodiments, core 250 may be collapsed or otherwise reduced in size to facilitate withdrawal from body 220 to provide cavity 228. As schematically shown in FIG. 4, the resulting light surround 214 has a body 220 that has a 3-dimensional shape similar to the 3-dimensional shape of body 20 described above with respect to ornament 10. Although the exterior profile of body 220 shown in FIG. 4 may be somewhat altered as compared to the interior profile of cavity 252 (shown in FIG. 3), in actual practice, the outer profile or configuration of body 220 will substantially be identical to the internal configuration of mold cavity 252.

As shown by FIG. 4, emitter 216 is subsequently inserted into cavity 228 of surround 214. According to one example embodiment, prior to insertion of emitter 216 into cavity 228, at least portions of emitter 216 are coated with a bonding material, which upon solidifying or curing is translucent, to bond emitter 216 so as to retain emitter 216 within cavity 228 of surround 214. In one embodiment in which body 220 of surround 214 is formed from silicone, emitter 216 is coated with a layer 264 of silicone. Upon insertion of emitter 216 into cavity 228, layer 264 makes conformal contact with the interior surface of cavity 228 and bonds emitter 216 to surround 214. In one embodiment, layer 264 is formed from a heat activated silicone, wherein substantial curing of layer 264 is initiated or wherein the rate at which layer 264 cures is enhanced at a curing temperature above room temperature. For purposes of this disclosure, the term "room temperature" means the temperature at which rooms are normally maintained and which are acceptable to living inhabitants (generally no greater than 120 degrees Fahrenheit). In one embodiment, layer 264 is formed from a silicone which is not in a substantial degree of curing until the material of layer 264 is heated to a temperature above room temperature. Heat activated silicone generally cures at a much faster rate as compared to silicone which is cured at room temperature.

According to one embodiment, emitter 216 coated with layer 264 is inserted into cavity 228 prior to completion of curing of layer 264, whereupon curing or solidifying, layer 264 bonds or fuses to body 220. According to one method, emitter 216 coated with layer 264 is inserted into cavity 228 prior to surround 214 having cooled since its formation (where the material of body 220 was injected in a heated state) to a temperature below the curing temperature of the material of layer 264. As a result, bonding time between emitter 216 and surround 214 is reduced and no additional energy is provided to facilitate curing of layer 264. Consequently, the manufacturing process is more economical. In other embodiments, surround 214 may be preformed and may be permitted to cool after its formation to a temperature below the curing temperature, wherein upon insertion of emitter 216 and the coated layer 264, surround 214 and the inserted emitter 216 are subsequently heated to a temperature above the cure temperature so as to cure the materials of layer 264 and to fuse layer 264 to body 220. In one embodiment where layer 264 and body 220 are both formed from silicone, enhanced bonding therebetween is achieved.

As indicated by the broken lines in FIG. 4, a layer 266 of bonding material may alternatively or additionally be provided or formed upon the interior surface of cavity 228 prior to insertion of emitter 264 into cavity 228. For example, in one embodiment, the interior surface of layer 228 may be coated with a fluid, viscous or semi-viscous silicone. Layer 266 may subsequently be cured or solidified while in conformal contact with emitter 216 or layer 264 (where provided) to bond emitter 216 to surround 214. In one embodiment, layer 266 may be applied to the interior surface of cavity 228 of surround 214 prior to surround 214 cooling since its formation to a temperature below the curing temperature of layer 266. Prior to completion of curing of layer 266, emitter 216 is inserted into cavity 228. In yet another embodiment, emitter 216 is inserted into cavity 228 into contact with layer 266 and surround 214 as well as layer 266 are subsequently heated to a temperature above the curing temperature. In still other embodiments, layer 266 may be formed from other bonding materials that are translucent.

As shown by FIG. 5, the resulting ornament 210 includes surround 214 bonded to an exterior head 234 of light emitter 216 by layer 264. At the same time, the electrical connection portion 270 of light emitter 216, such as the screw-in portion of an incandescent bulb, remain exposed for insertion into a power source such as power source 18 (shown in FIGS. 1 and 2). Light surround 214 insulates and protects emitter 216 while also transmitting light from emitter 216 and while also providing an illuminated 3-dimensional decorative or ornamental structure. Although emitter 216 is illustrated as an incandescent bulb, in other embodiments, emitter 216 may comprise other light emitting devices such as one or more light emitting diodes or devices configured to emit other forms of electromagnetic radiation.

Figure 7:
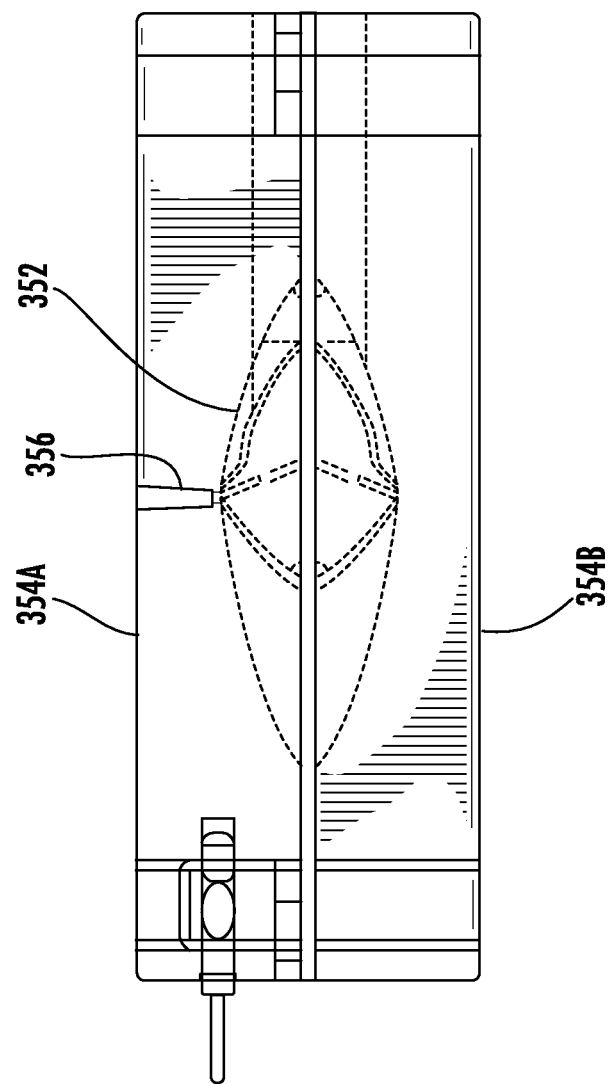
FIG. 7 is a side elevational view of a substantially complete mold including the mold portion of FIG. 6 taken along line 7-7 according to an example embodiment.
Figure 8:
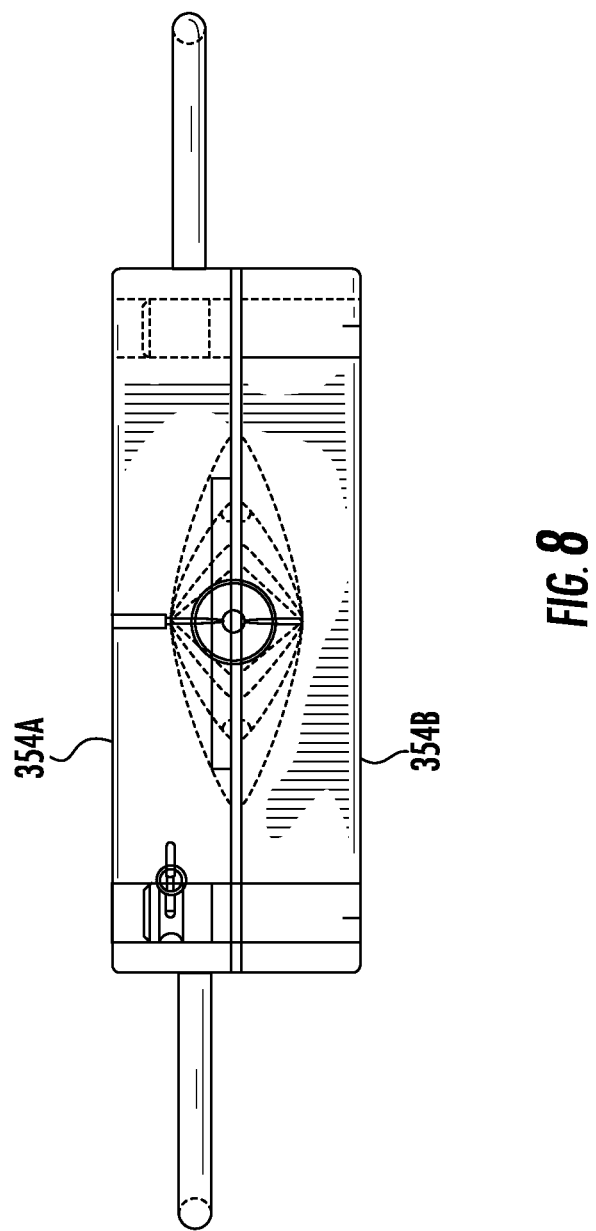
FIG. 8 is a side elevational view of the substantially complete mold including the mold portion of FIG. 6 taken along line 8-8 according to an example embodiment.
Figure 9:
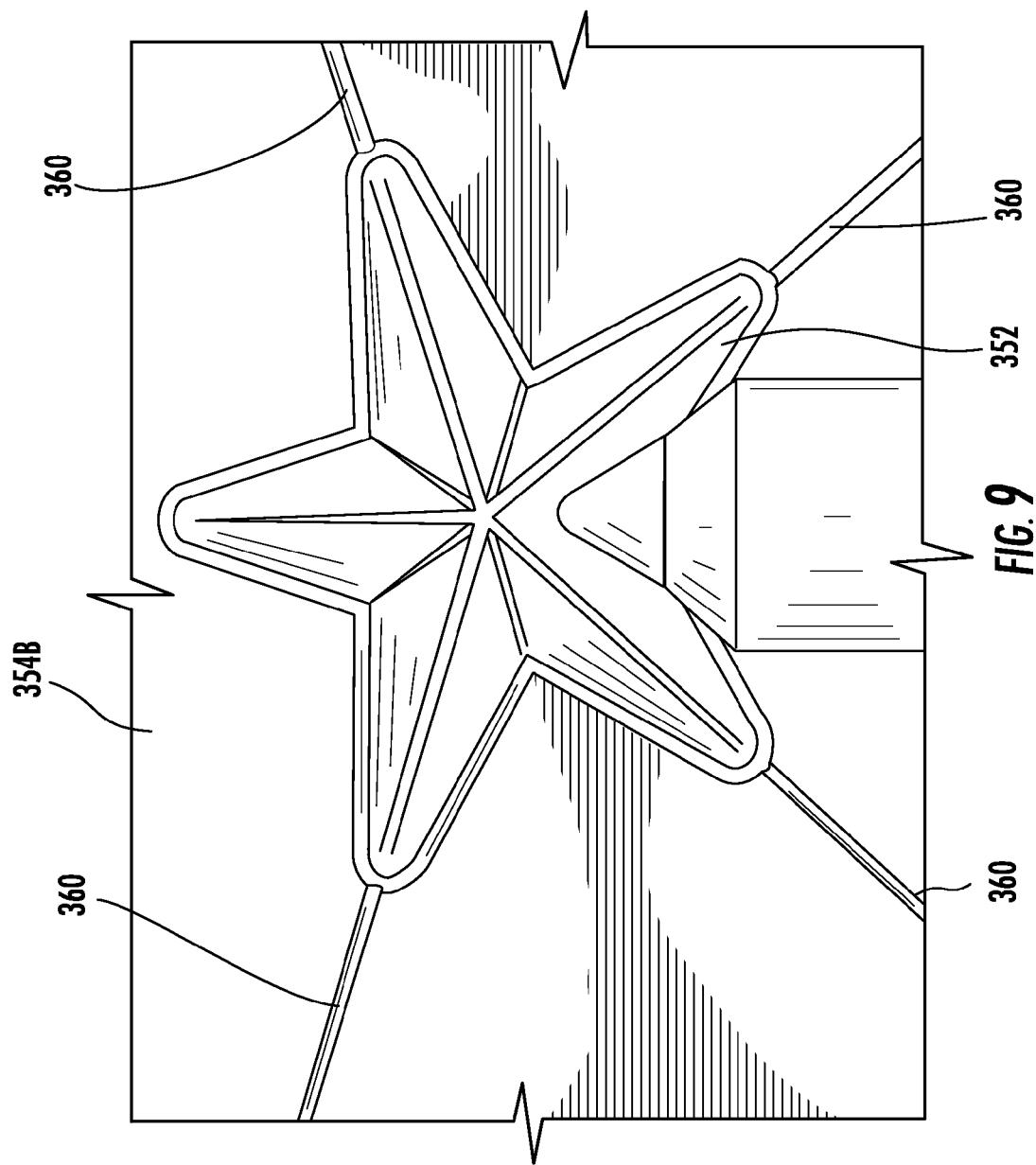
FIG. 9 is an enlarged top plan view of the mold portion of FIG. 6 according to an example embodiment.
Figure 11:
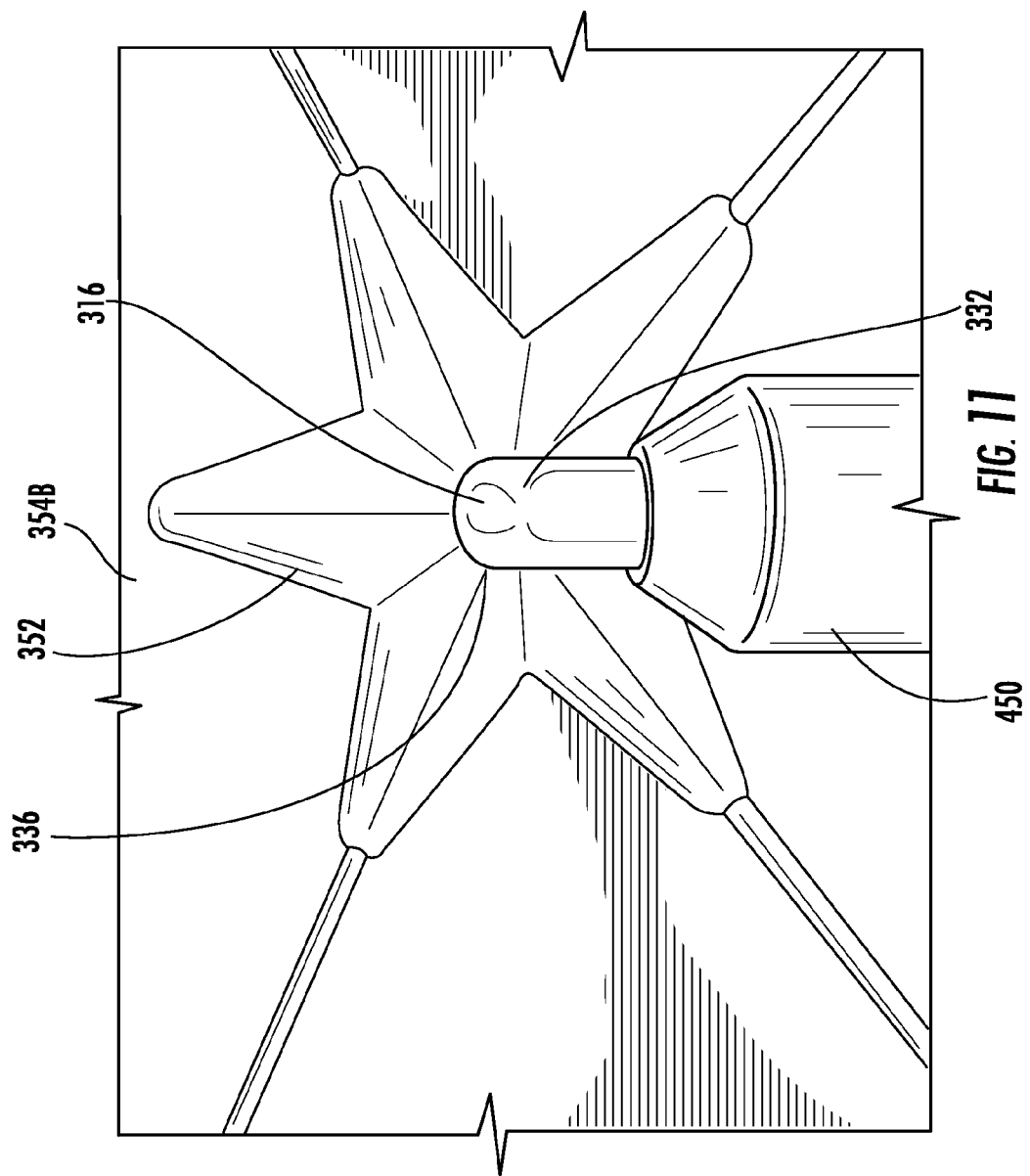
FIG. 11 is a top plan view of the mold portion of FIG. 9 additionally illustrating a light source positioned within the cavity of the mold according to an example embodiment.
Figure 12:
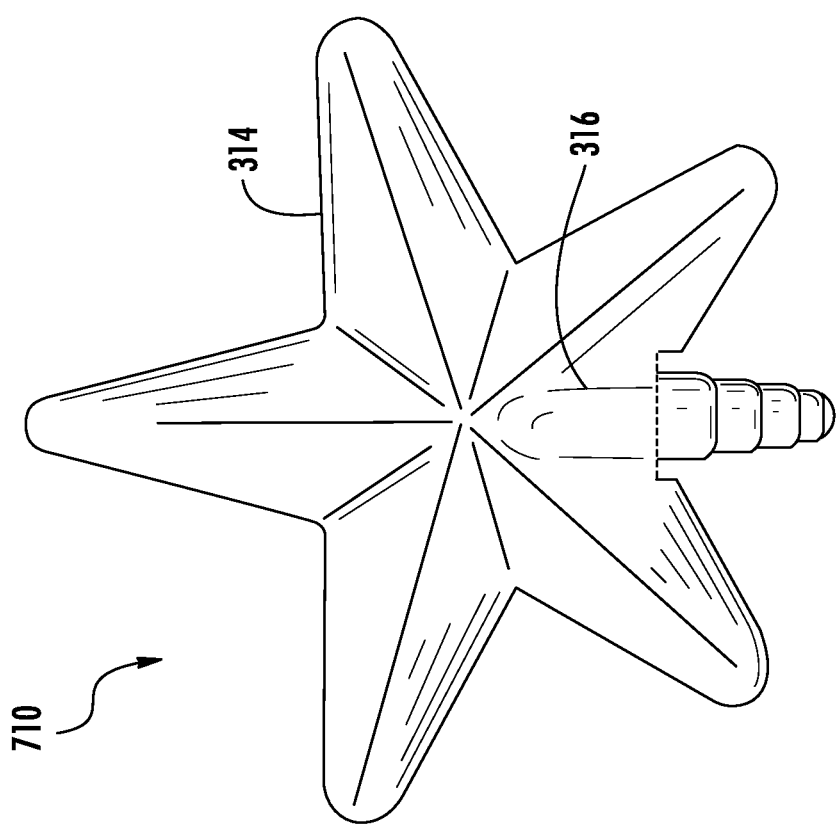
FIG. 12 is a top plan view of another embodiment of the ornament of FIG. 1 formed with the mold illustrated in FIGS. 6-9 according to an example embodiment.

FIGS. 6-9 illustrate a method for forming an ornament such as the ornament 610 shown in FIGS. 11 AND 12. FIGS. 6-9 illustrate mold 353 including mold portions 354A, 354B (shown in FIGS. 7 and 8 which are sectional views of mold 353 shown in FIG. 6). FIG. 9 illustrates mold portion 354*b*, In the particular example illustrated, mold 353 is configured to form a light surround 14 or 214 in the configuration of a 5-point star having 5 "legs" with beveled or inclined sides. As shown by FIGS. 7 and 8, mold portion 354*a* includes a sprew hole 356 through which the material of the body of the surround is injected into the mold. According to one embodiment, silicone is injected through sprew hole 356 into the interior cavity 352 of mold 353. As shown in FIG. 9, mold path 354*b* additionally includes vents 360 through which gas or air may escape during injection of the material 257 (shown in FIG. 3) into cavity 352.

Figure 10:
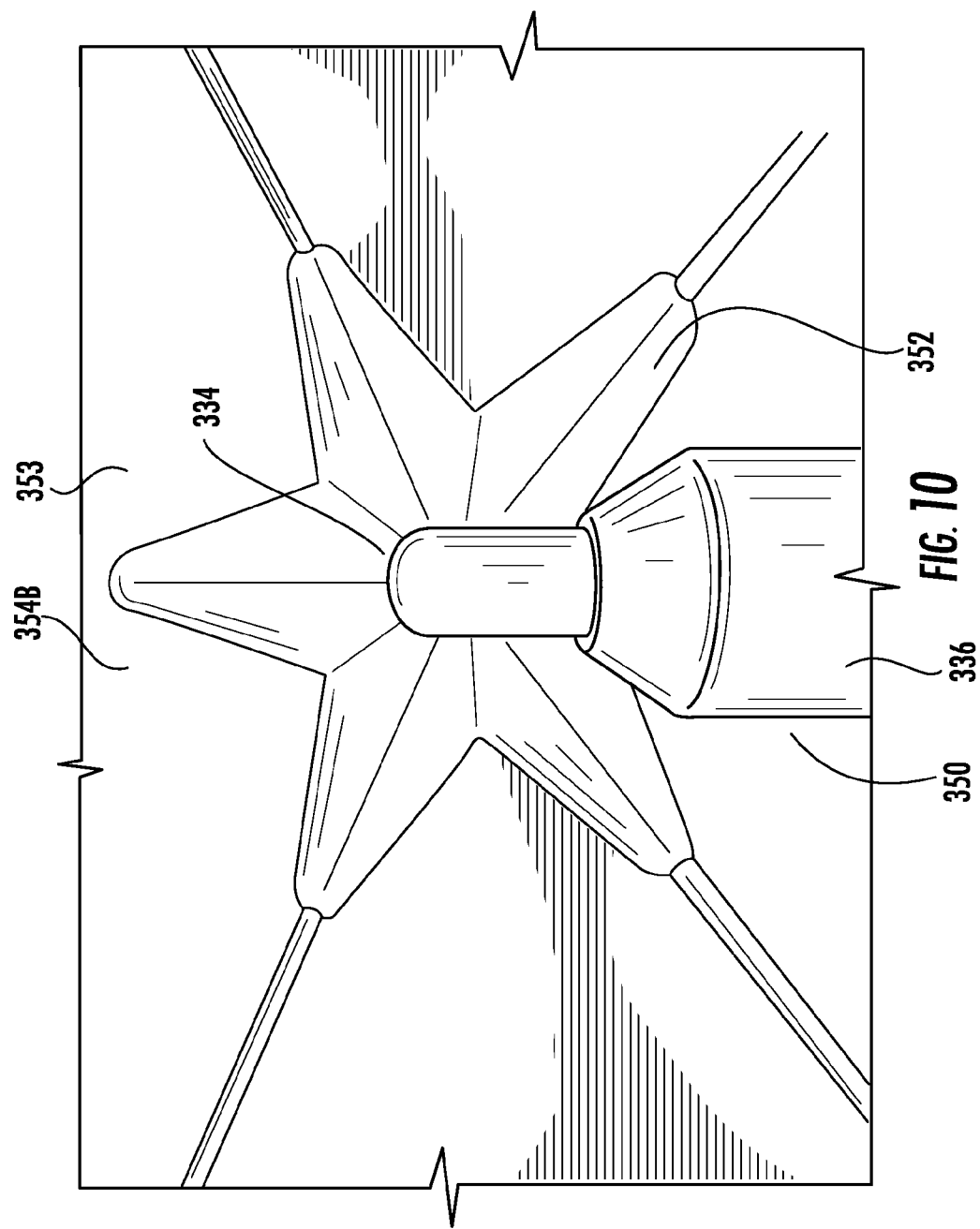
FIG. 10 is a top plan view of the mold portion of FIG. 9 additionally illustrating a core positioned within a cavity of the mold portion according to an example embodiment.

FIG. 10 illustrates the positioning of a core 350 into cavity 352 of mold 353 prior to injection of material 257 into mold 353. In the particular example illustrated, core 350 includes a nylon stop or neck portion 336 and a head portion 334 configured to statutes similar to the outer configuration of the light emitter or bulb to be inserted into the resulting surround 214. In the particular example illustrated, head portion 334 is formed from the heat resistant rigid material, such as a metal. As noted above with respect to the process described in FIGS. 3-5, mold portion 354*a* (shown in FIGS. 7 and 8) is subsequently positioned against mold portion 353 with core 350 therebetween. Thereafter, the material 257, such as silicone, is injected through a sprew hole 356 (FIGS. 7 and 8) into cavity 352 about a portion 334 and against neck portion 336 of core 350. Upon sufficient curing or solidification of the material about core 350, mold portion 354A and 354B are separated and a light emitter is inserted into the resulting internal cavity of the formed surround.

FIG. 11 illustrates a portion of an alternative method performing an ornament such as ornaments 10 or 210. In particular, FIG. 11 illustrates mold portion 354B of mold 353. FIG. 11 further illustrates the positioning of natural light emitter 316 (shown as an incandescent bulb) into cavity 352. As shown by FIG. 11, the head portion 64 of emitter 316 is substantially similar to core 334 (shown FIG. 10). Emitter 316 further includes an electrical connection portion 270 (shown in FIGS. 4 and 5) screwed into or otherwise received by core 450. Core 450 is similar to core 350 except that core 450 supports and retains emitter 316 within cavity 352 during injection of a material, such as silicone, about and against emitter 316. Core 450 further seals the opening of mold 353 along which emitter 316 is positioned into cavity 352. In one embodiment, core 450 is formed from a soft compressible material, such as nylon, so as to serve as a gasket between mold portions 354*a* (shown in FIGS. 7 and 8) and 354*b*.

Figure 13:
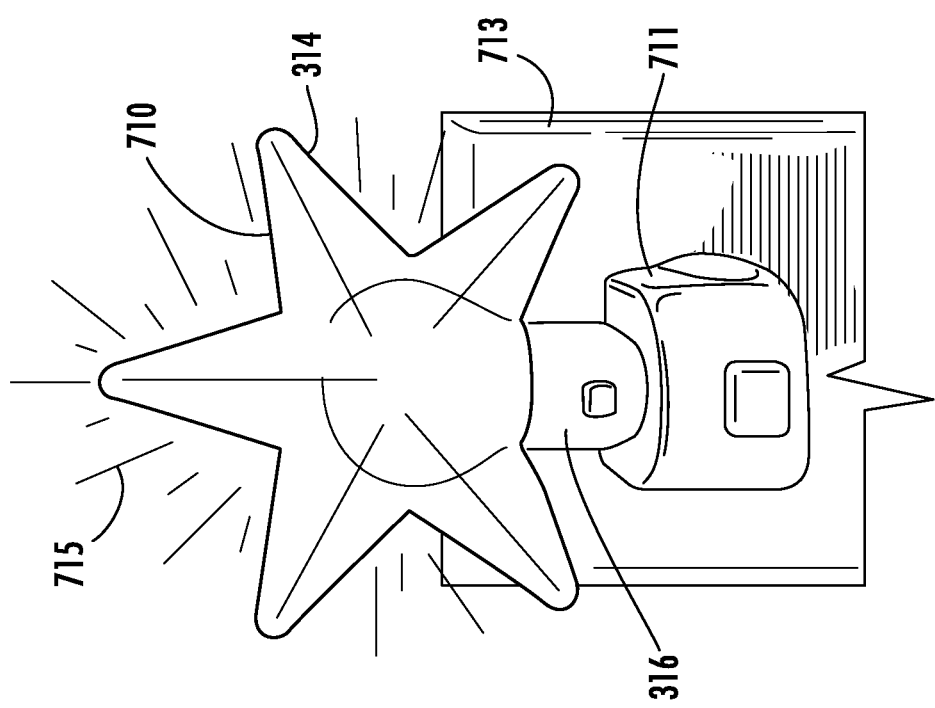
FIG. 13 is a top perspective view illustrating another embodiment of the ornament of FIG. 1 being electrically powered and providing illumination according to an example embodiment.

According to such an alternative process, emitter 316 is screwed or inserted into core 450 and core 450 is positioned between mold halves 354*a* and 354*b* such that the light origin 332 of emitter 316 is substantially centered within cavity 352. In a particular example illustrated, origin 332 of emitter 316 is positioned at the center of star to be formed. Once mold portion 354*a* and 354*b* are positioned into close conforming or mating engagement with one another and against core 450, soft or flexible material, such as silicone, is injected through sprew hole 356 (shown in FIGS. 7 and 8) into cavity 352 and about and against head portion 336 of emitter 316. Upon sufficient solidification or curing of the material, mold halves 354a and 354b are separated and core 450 is removed from portion 270 of emitter 316. The resulting ornament is shown in FIG. 12. As shown in FIG. 13, the resulting ornament 710 having light emitter 316 and surround 314 may be screwed or otherwise screwed into an electrical socket 711 electrically connected to a wall outlet 713 or other electrical power source to as to be provided with power, whereby emitter 316 emits visible light 715 which is at least partially transmitted through the translucent material of surround 314.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompasses a plurality of such particular elements.

What is claimed is:

1. An apparatus comprising:
   a light emitter;
   a surround about the light emitter, the surround comprising one or more layers of silicone; and
   plant materials internally encapsulated within and throughout the one or more layers of silicone, wherein the plant materials are visible through the one of more layers of silicone and provide a scent.

2. The apparatus of claim 1, wherein the plant materials comprise coffee grains.

3. The apparatus of claim 1, wherein the plant materials comprise seeds.

4. The apparatus of claim 1, wherein the plant materials comprise poppy seeds.

5. The apparatus of claim 1, wherein the plant materials comprise spices.

6. The apparatus of claim 5, wherein the spices are visible through the one of more layers of silicone and provide a scent.

7. The apparatus of claim 1, wherein the light emitter comprises an incandescent bulb having an externally threaded end.

8. The apparatus of claim 1, when the light emitter comprises one or more light emitting diodes.

9. The apparatus of claim 1, wherein the plant materials comprise ground or cut flower parts.

10. The apparatus of claim 1, wherein the one of more layers of silicone have varying thicknesses extending from the light emitter to form a three-dimensional shape about the light emitter.

11. The apparatus of claim 1, wherein the surround is colored.

12. The apparatus of claim 1, wherein the surround is formed from a first silicone and a second distinct silicone.

13. The apparatus of claim 1, wherein the first silicone is a first color and wherein the second silicone is a second color.

14. The apparatus of claim 1, wherein the first silicone has a first scent and wherein the second silicone has a second scent.

15. The apparatus of claim 1, wherein the surround has a shape selected from a group of shapes consisting of:
   one or more stars, one or more hearts, one or more eggs, one or more crosses, one or more pumpkins, one or more bunnies, one or more Christmas trees, one or more Santas, one or more bells, one or more candy canes, one or more candles, one or more snowmen, one or more snowflakes and one or more shamrocks.

16. The apparatus of claim 1, wherein the plant materials comprise whole or cut unground plant material.

17. An apparatus comprising:
   a light emitter;
   a surround about the light emitter, the surround comprising one or more layers of silicone; and
   plant materials internally encapsulated within and throughout the one or more layers of silicone, wherein the plant materials comprise spices and wherein the spices are visible through the one of more layers of silicone and provide a scent.

18. The apparatus of claim 1, wherein the surround is formed on an envelope of the light emitter.

19. The apparatus of claim 1, wherein the plant materials comprise whole, ground or cut plant opaque material selected from a group of plants consisting of seeds, spices and flower parts.

* * * * *